(12) United States Patent
Nabeiro et al.

(10) Patent No.: US 12,070,152 B2
(45) Date of Patent: Aug. 27, 2024

(54) BEVERAGE DISTRIBUTION SYSTEM WITH OPTIMIZED BEVERAGE DISCHARGE

(71) Applicant: NOVADELTA—COMÉRCIO E INDÚSTRIA DE CAFÉS S.A., Lisbon (PT)

(72) Inventors: Rui Miguel Nabeiro, Campo Maior (PT); Jesús Medina Mundt, Lisbon (PT)

(73) Assignee: NOVADELTA—COMÉRCIO E INDÚSTRIA DE CAFÉS S.A., Lisbon (PT)

( * ) Notice: Subject to any disclaimer, the term of this patent is extended or adjusted under 35 U.S.C. 154(b) by 705 days.

(21) Appl. No.: 16/605,594

(22) PCT Filed: Apr. 16, 2018

(86) PCT No.: PCT/PT2018/050014
§ 371 (c)(1),
(2) Date: Oct. 16, 2019

(87) PCT Pub. No.: WO2018/194475
PCT Pub. Date: Oct. 25, 2018

(65) Prior Publication Data
US 2020/0129003 A1    Apr. 30, 2020

(30) Foreign Application Priority Data
Apr. 18, 2017  (PT) .......................................... 110031

(51) Int. Cl.
*A47J 31/46*     (2006.01)
*A47J 31/40*     (2006.01)
*A47J 31/44*     (2006.01)

(52) U.S. Cl.
CPC ............ *A47J 31/461* (2018.08); *A47J 31/407* (2013.01); *A47J 31/4403* (2013.01); *A47J 31/468* (2018.08)

(58) Field of Classification Search
CPC .... A47J 31/407; A47J 31/4403; A47J 31/461; A47J 31/468; B67D 1/0894
See application file for complete search history.

(56) References Cited

U.S. PATENT DOCUMENTS

| | | | |
|---|---|---|---|
| 8,777,182 B2 * | 7/2014 | Springer | ............ A47G 19/2205 137/499 |
| 9,957,149 B2 * | 5/2018 | Park | ....................... B65D 47/06 |

(Continued)

FOREIGN PATENT DOCUMENTS

| | | |
|---|---|---|
| DK | 102009048233 A1 | 4/2010 |
| KR | 200486419 Y1 * | 12/2016 |

(Continued)

OTHER PUBLICATIONS

Machine translation of KR-200486419: Lee, The water supply bottle for a dutch coffee extracting apparatus, 2016 (Year: 2016).*

(Continued)

*Primary Examiner* — Janie M Loeppke
*Assistant Examiner* — Abigail H Rhue
(74) *Attorney, Agent, or Firm* — Sughrue Mion, PLLC

(57) ABSTRACT

A system for distribution of beverages, in particular a system for preparing espresso coffee and similar aromatic beverages, comprising at least one type of beverage recipient (1, 1'), for example of the type glass, cup or similar, a beverage discharge disposition (2) operatively associated with a beverage preparation device (3), whereby said beverage discharge disposition (2) is provided so that the beverage discharge flow impinges, with a given flow pressure, a flow regulation disposition (12) in the base region (11) of bev- (Continued)

erage recipient (1, 1') along a direction opposite to the gravity force. The beverage recipient (1, 1') presents a flux constrain element (13) downstream of said flow regulation disposition (12) and adapted so that provides more advantageous conditions of beverage discharge, in particular of espresso coffee and other aromatic beverages, to the interior of said beverage recipient (1, 1').

14 Claims, 6 Drawing Sheets

(56) References Cited

U.S. PATENT DOCUMENTS

| | | | |
|---|---|---|---|
| 9,974,412 B2* | 5/2018 | Kollep | A23F 5/262 |
| 10,390,640 B2* | 8/2019 | Turner | B65D 17/502 |
| 2008/0223478 A1* | 9/2008 | Hantsoo | B67D 1/0894 |
| | | | 141/2 |

FOREIGN PATENT DOCUMENTS

| | | |
|---|---|---|
| WO | 2011091047 A1 | 7/2011 |
| WO | 2017200409 A1 | 11/2017 |

OTHER PUBLICATIONS

International Search Report for PCT/PT2018/050014 dated Jul. 19, 2018 [PCT/ISA/210].

Written Opinion for PCT/PT2018/050014 dated Jul. 19, 2018 [PCT/ISA/237].

\* cited by examiner

BEVERAGE DISTRIBUTION SYSTEM WITH OPTIMIZED BEVERAGE DISCHARGE

CROSS REFERENCE TO RELATED APPLICATIONS

This application is a National Stage of International Application No. PCT/PT2018/050014, filed on Apr. 16, 2018, which claims priority from Portuguese Patent Application No. 110031, filed on Apr. 18, 2017, the entire contents of each of which are herein incorporated by reference in their entireties.

FIELD OF THE INVENTION

The present invention refers to the field of beverage distribution systems, in particular systems for preparing espresso coffee and similar, presenting beverage discharge means to inside of a recipient along a direction that is substantially opposite to that of the gravity force.

BACKGROUND OF THE INVENTION

The prior art presents several solutions of beverage discharge in beverage preparation machines. In particular in the case of aromatic beverages such as for example espresso type coffee, this beverage discharge is a relevant process with potential impact in the quality of beverage obtained in the recipient. In fact, in particular in the case of espresso type coffee, the main characteristics of discharge flow determines several aspects such as the production of creme and the retention thereof inside of the cup, and the temperature variation as a result of exposure to air during the discharge down to a cup.

The documents EP 2120652 B1 and CH 702947 A2 disclose beverage preparation systems, including espresso coffee, with beverage discharge along a direction opposite the gravity force and through the support base of recipient. In these cases, it is necessary that an upstream discharge part can directly impinge in a disposition in the recipient of the type one-way valve. In particular, the document EP 2120652 B1 discloses a beverage recipient that presents a discharge channel configured as flow blocking device, provided in form of one-way valve inside of the beverage recipient. Said blocking device is disposed in the free edge of the discharge channel that extends upwards above into the interior of the beverage collection space, and simultaneously forms a deflection element with a "T"-like transversal piece, for example slightly arched or curved. Moreover, the document discloses a beverage recipient that presents a base portion adapted so that can engage in retention in removable manner with a beverage discharge disposition.

The document WO 2014/086915 A1 seems to disclose a solution similar to those of the aforementioned documents.

The documents DE 10 2009 048233 A1 and WO 2015/173127 A2 disclose beverage preparation systems whereby the flow flows in a direction opposite the gravity force inside of a brewing device that collects the edible substance precursor of beverage.

The document US 2008/0223478 A1 discloses a fluid discharge disposition through the base of a recipient, whereby said recipient presents a valve movable under the flow pressure. Preferred embodiments include the use of valve of duck-beak type, of umbrella type, whereby the flow passage is enabled as a result of a temporary deformation of a part thereof while the valve is impinged by upstream pressurized flow.

The document EP 2285687 B1 discloses a system comprising an injector that engages in a cap provided in the recipient, moving the latter upwards and thereby releasing an opening in the injector and enabling that the beverage flows to the interior of the recipient.

The document EP 2928347 B1 discloses a beverage preparation device of the type of the present invention whereby the beverage recipients present a retention portion apparently similar to that disclosed by document EP 2120652 B1, and safety activation means of the magnetic type adapted so that actuate a discharge valve depending on their presence and/or proximity. The beverage recipient preferentially comprises beverage entry means, such as a valve or opening that can be selectively opened and integrally formed in the exterior wall of the receptacle, whereby said beverage entry means are provided in a support in the base region, and whereby said support extends to the lowest level of said beverage receptacle. In particular, said beverage recipients present a valve-like disposition that comprises a part with a plurality of flux passageways oriented along a direction transversal relative to the prevailing flow direction.

The document WO 2016/071880 A1 discloses a recipient that comprises a valve provided in the base and that presents a deformable element that is mounted under pressure in a sealing position and that can be deformed to a filling position when the liquid injection pressure is bigger than a previously determined compression value of said deformable element.

GENERAL DESCRIPTION OF THE INVENTION

The objective of the present invention is to provide a beverage distribution system presenting a beverage discharge disposition that the pressurized injection of the beverage discharge flow to the interior of a beverage recipient along a direction opposite to the direction of the gravity force, through a base region of said beverage recipients, and that is adapted so as to provide better conditions of beverage discharge flow to the interior of the beverage recipient, in particular adapted to the beverage characteristics, in particular formation of creme in the case of coffee of espresso type, as well as avoiding the risk of any spills of hot beverage out of the recipient during discharge, while at the same time providing beverage recipients of reduced construction complexity and appearance similar to recipients to be filled by the top.

This objective is attained according to the present invention by means of a beverage preparation system according to claim 1, whereby preferred embodiments are described in the secondary claims.

In particular, the aforementioned objective is solved by means of a system whereby the beverage recipients comprise a flow regulation disposition and further a flux constrain disposition provided stationary in the proximity downstream of said flow regulation disposition, and associated with a flow passageway opening through the base of recipient, and configured so that changes at least one of prevailing flow direction and flow passageway section along the flux constrain disposition, so that the flow pattern at the entry in the base region of the collection space is different from the flow pattern directly downstream of said flow regulation disposition.

It is preferred when said flux constrain disposition is arranged in a stationary position and provided as at least one of: a piece retained in removable manner in a portion of the base region of said beverage recipient, an integral part of the base region of said beverage recipient.

It is preferred when said flux constrain disposition develops in at least one of: at least partially in the interior of said flow passageway opening, at least in the proximity and at least in its most part not above of the interior surface of the base wall in the base region of the collection space.

In particular, it is preferred when said flux constrain disposition does not project above of the interior side of the base wall, in the direction of the interior of collection space configured by the exterior walls of said beverage recipient.

It is preferred when said flux constrain disposition presents a deflecting element that develops at least approximately aligned with the interior surface of the base wall of said beverage recipient.

It is preferred when said flux constrain disposition is surrounded by said base wall, configuring a narrow passage space, preferentially with less than 10 mm width, between its exterior perimeter and said base wall, adapted for flow passage of the beverage.

It is preferred when at least part of said flux constrain disposition is provided in a substantially rigid material or with reduced elastic deflection, in particular it is preferred when said flux constrain disposition presents a flow deflecting element that presents elastic behaviour in an exterior perimeter region thereof.

It is preferred when said flux constrain disposition provides a plurality of flow passageways that develop in the downwards-oriented face of a flow deflecting element, so that said beverage flows through at least two, preferentially at least four, flow passageways that extend along a perimeter of said flow deflecting element.

It is preferred when said flow regulation disposition is adapted so that provides passageway to a beverage discharge flow only in one flow direction, for example of the type one-way valve or plurality of adjacent micro-holes, and only if impinged with a flow pressure bigger than 1.5 bar, particularly preferentially bigger than 10 bar.

It is preferred when said flow regulation disposition is provided as a one-way valve, and adapted so that can be retained by means of pressured fitting in the passageway opening in the base region of beverage recipient.

In particular, the system can include different types of beverage recipients presenting different dimensions, such as for example the volume of the collection space, diameter of the base regions, but adapted so that can be retained in a same type of beverage discharge disposition, in particular presenting at least one of: a second engagement part of similar dimensions and similar respective flow regulation disposition, whereby it is further preferred when at least one of said types of beverage recipients is not a disposable recipient.

It is preferred when said beverage discharge disposition is provided on a more elevated level than a brewing device, so that any rests of beverage discharge can be retained upstream of the beverage discharge disposition under the action of the gravity force, whereby said brewing device is provided inside or outside of the chassis of the beverage preparation apparatus.

It is preferred when the system provides the preparation of at least one type of beverage, including at least a brewing device, for preparation of espresso type coffee and other aromatic beverages, adapted for collecting an individual portion of edible substance, optionally provided inside of a respective capsule.

DESCRIPTION OF THE FIGURES

The invention shall hereinafter be explained in greater detail based upon preferred embodiments and the attached Figures.

The Figures show, in simplified schematic representations.

DETAILED DESCRIPTION OF PREFERRED EMBODIMENTS OF THE INVENTION

Figure 1:
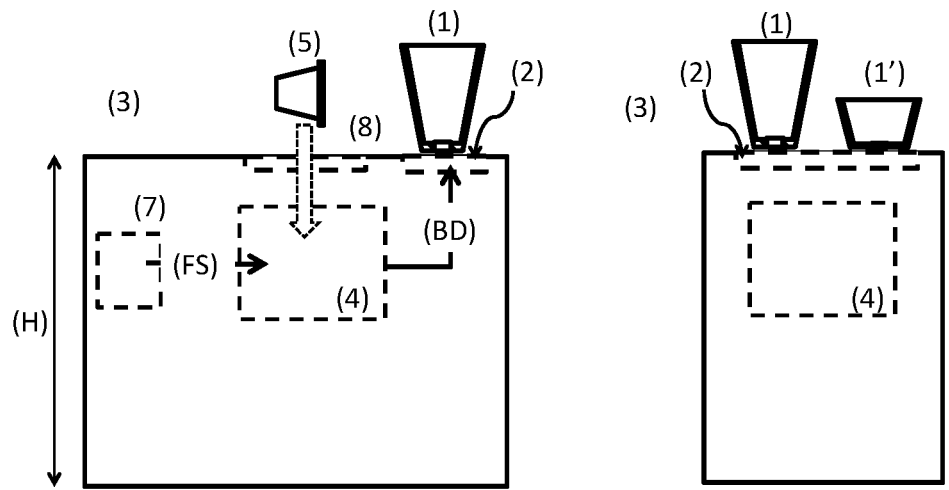
FIG. 1: side and front views of a beverage preparation apparatus (3) in a beverage distribution system according to prior art.

FIG. 1 represents side, on the left side, and frontal views, on the right side, of a beverage distribution system according to prior art.

Said system comprises at least one type of beverage recipient (1, 1'), such as for example a cup or a glass, that presents a base wall (11) comprising a flow passageway opening (110) and a flow regulation disposition (12), whereby said beverage recipient (1) is adapted so that can be retained in a beverage discharge disposition (2).

Said system comprises a beverage apparatus (3), for example in the form of machine for preparing espresso coffee and similar aromatic beverages, that presents at least one brewing device (4) provided as interior or exterior part of the casing of said apparatus (3), and so that can collect a portion (5) of edible substance precursor of beverage, for example contained in a capsule or similar.

Moreover, it is preferred when said beverage apparatus (3) includes a fluid reservoir (not represented), as well as a flow pressurization device (7) and a fluid heating device (not represented), so that can provide a flow supply (FS) at a temperature comprised between 60 and 100° C. and at a pressure comprised between 1 and 20 bar, preferentially more than 10 bar, so as to interact with said edible substance.

Said discharge flow (BD) is afterwards conducted from an exit of said brewing device (4) to a beverage discharge disposition (2) arranged downstream thereof and that includes at least one beverage discharge element (21) adapted for engaging, preferentially by means of pressured fitting, with the base region (11) of a beverage recipient (1, 1').

The system includes a plurality of types of beverage recipients (1, 1') presenting different dimensions, for example diameter, of respective base walls (11), but adapted so as to engage in a same type of beverage discharge disposition (2), whereby at least one of said types of beverage recipients (1, 1') is not a disposable recipient.

It is preferred when said beverage discharge disposition (2) is provided at a more elevated plane than said brewing device (4), so that any rests of beverage discharge can be retained upstream of, that is at a lower level than, the beverage discharge disposition (2) by action of the gravity force.

Figure 2:
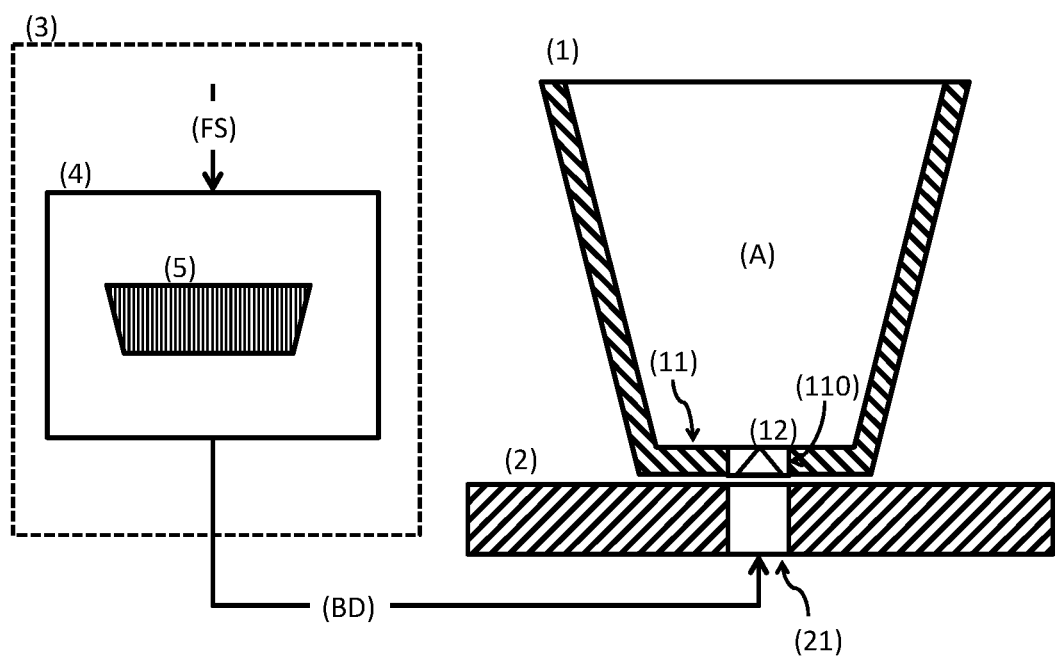
FIG. 2: side view of main components of a beverage distribution system according to prior art.

As represented in FIG. 2, said types of beverage recipients (1, 1') can present a flow regulation disposition (12), for example of the type one-way valve (symbolically represented by a triangle), provided retained in a flow passageway opening (110) of said base wall (11) and adapted so that provides passageway to a pressurized flow of beverage discharge (BD) downstream, to said collection space (A), along a direction opposite to the gravity force, if impinged with a flow pressure bigger than a previously defined value of pressure flow.

Figure 3:
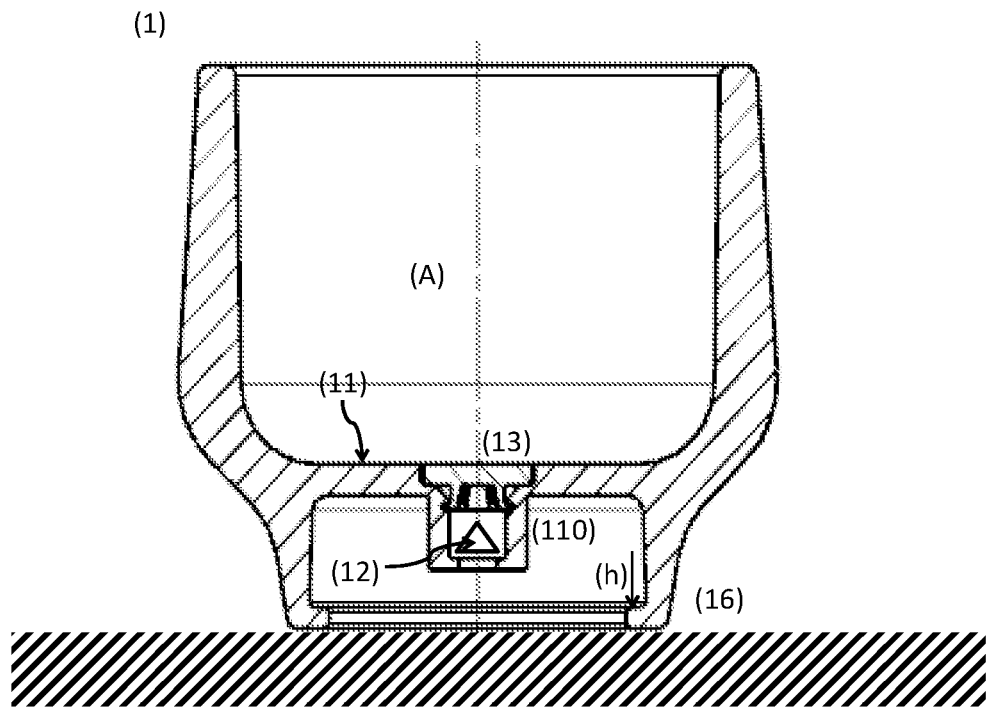
FIG. 3: side-cut view of a first embodiment of beverage recipient (1) of a beverage distribution system according to the present invention.
Figure 4:
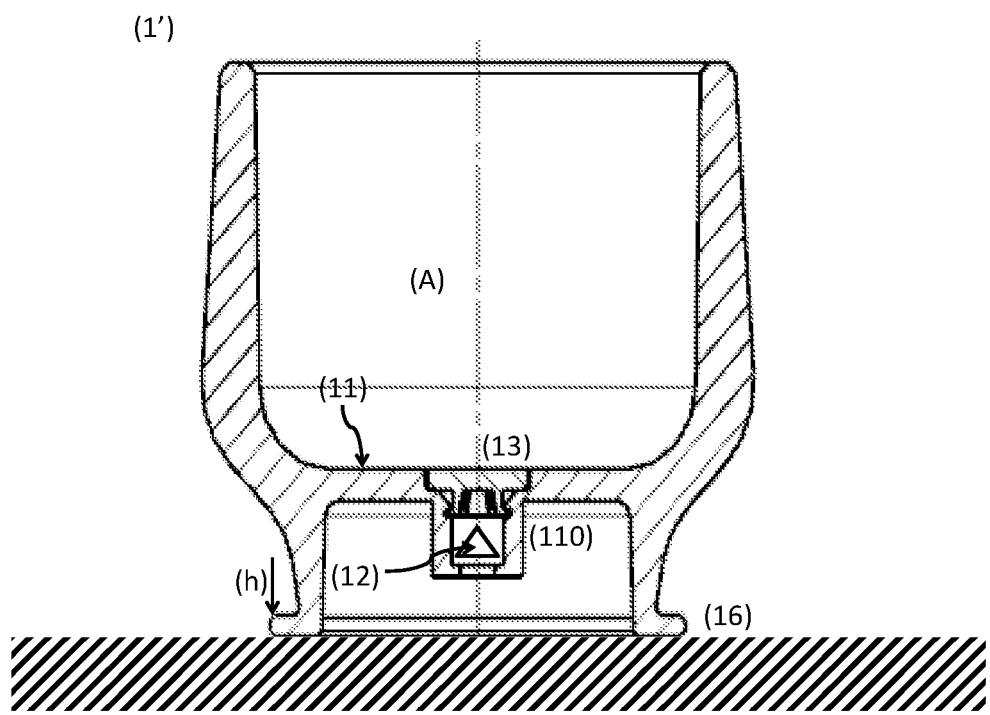
FIG. 4: side-cut view of a second embodiment of beverage recipient (1) of a beverage distribution system according to the present invention.

FIGS. 3 and 4 represent preferred embodiments of beverage recipients (1, 1') of the cup, glass type or similar, of a beverage preparation system according to the invention.

The beverage recipients (1, 1') comprise a base wall (11) that can present a flow passageway (110) where there is provided said flow regulation disposition (12), again symbolically represented by a triangle. It is preferred when said flow regulation disposition (12) is provided by a device of the type one-way valve, in particular a valve regulated by the upstream flow pressure, such as for example of the butterfly or umbrella type, presenting an elastic element that provides an opening of a respective flow passageway when impinged with a given pressure, and closure when not impinged therewith, in particular provided so that only enables flow passageway when the upstream flow pressure is bigger than 1.5 bar, preferentially bigger than 3 bar, particularly preferentially bigger than 8 bar.

Alternatively, the beverage recipient (1) can present a flow regulation disposition (12) in the form of a plurality of micro-holes dimensioned so that only provide flow passageway when impinged with a previously defined flow pressure bigger than the atmospheric pressure.

According to an inventive aspect, the beverage recipient (1) further comprises a flux constrain disposition (13) associated with said flow passageway opening (110), for example provided retained inside thereof, downstream of said flow regulation disposition (12), and adapted so that provides at least one of: at least one flow impact wall and at least one constrain of flow passageway section, thereby reducing the velocity of discharge flow (BD) until the entry in said collection space (A).

The beverage discharge flow (BD) thereby flows to the interior of said collection space (A) at a more reduced velocity, preferentially by means of a space of reduced dimensions of gap type, or similar, that is provided as an opening that is co-planar with the remanding interior surface of the collection space (A), so that no flow admission holes are perceptible inside of said collection space (A).

It is herewith advantageously provided a discharge of aromatic beverage, such as for example coffee of espresso type that is more favourable in terms of formation and retention of creme and in terms of less exposition to the ambient temperature, contributing to a better quality in the cup. In fact, the discharge to the interior of a beverage recipient (1) through a respective base region (11) provides a better distribution of beverage inside thereof, thereby further avoiding the risk of any hot fluid spill overs.

Moreover, the beverage recipients (1, 1') present an engagement part (16) associated with said base region (11) and adapted so that can be retained on said beverage discharge disposition (2).

FIG. 3 shows a first embodiment of beverage recipient (1) where a projection part of respective engagement part (16) develops radially outwards, so that can be retained by the exterior perimeter in a respective beverage discharge disposition (2), whereas FIG. 4 shows a second embodiment of beverage recipient (1') whereby the projection portion of the engagement part (16) develops radially inwards with relation to the central axis of beverage recipient (1'), so that can be retained by the exterior perimeter in a respective beverage discharge disposition (2).

It is preferred when said flow regulation disposition (12) is provided as a one-way valve, for example of the type butterfly, umbrella, or similar, and adapted so that can be retained by means of pressured fitting in the flow passageway opening (110) provided in the base region (11) of said beverage recipients (1, 1').

Figure 5:
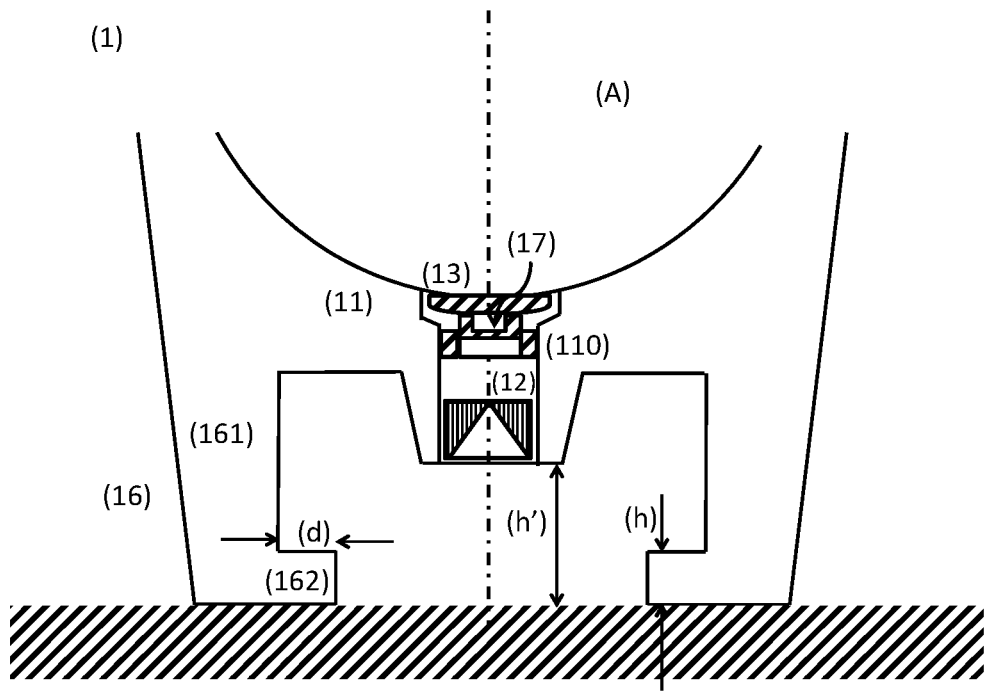
FIG. 5: side-cut view of detail of the base region (11) of beverage recipient (1) in a beverage distribution system according to the present invention.
Figure 6:
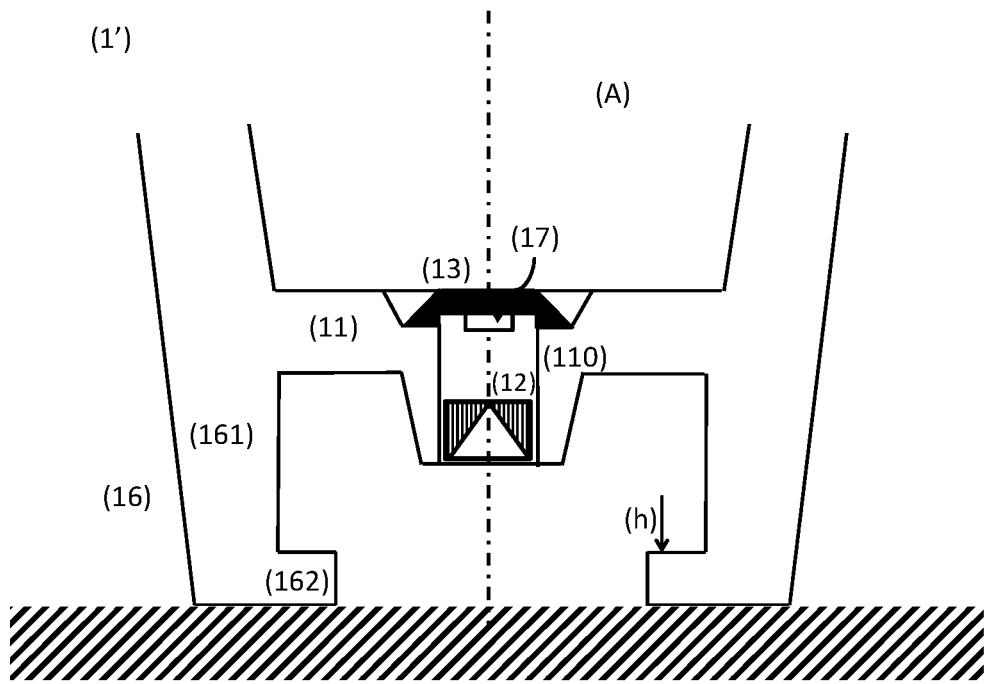
FIG. 6: side-cut view of detail of the base region (11) of beverage recipient (1) in a beverage distribution system according to the present invention.

FIGS. 5 and 6 represent two embodiments of association of said flux constrain disposition (13) in the base region (11) of beverage recipients (1, 1').

In a first embodiment represented in FIG. 5, the flux constrain disposition (13) is provided as an individual piece, for example in a synthetic material, and retained, including by elastic means, or by pressured fitting, in a flow passageway opening (110) provided in said base region (11). In particular, said flux constrain disposition (13) presents a disk type shape, or similar, and is adapted so that can be retained by means of pressured fitting in said flow passageway opening (110), in particular so that its retention thereon can resist to a flow pressure of at least 15 bar, preferentially at least 20 bar.

In a second embodiment represented in FIG. 6, the flux constrain disposition (13) is provided integral in a single piece with the base region (11) of beverage recipient (1').

According to a preferred embodiment, said beverage recipient (1, 1') presents an engagement portion (16) that comprises a first part (161) that develops downwards, and a second part (162) that develops along a transversal direction with relation to the centre of beverage recipient (1, 1'), whereby said first and second parts (161, 162) are configured with a shape that provides shape engagement of engagement elements (23) associated with said beverage discharge disposition (2), in particular presenting an engagement depth (d) and an engagement height (h) bigger than 0.5 mm and smaller than 25 mm, e, preferentially, providing a free height (h'), preferentially bigger than said engagement height (h), in the interior region that they delimit above of said recipient placement surface (22).

It is preferred when said first and second parts (161, 162) present a total height comprised between 10 and 50 mm, preferentially between 15 and 45 mm, and confine an interior cavity with a free height (h') of at least 10 mm.

It is preferred when said second part (162) defines an interior diameter of at least 10 mm, preferentially comprised between 20 mm and 80 mm, particularly preferentially between 30 and 60 mm.

It is preferred when said second part (162) presents an engagement depth (d) along the direction transversal to the prevailing flow direction, comprised between 2 and 10 mm, preferentially between 4 and 8 mm.

Figure 7:
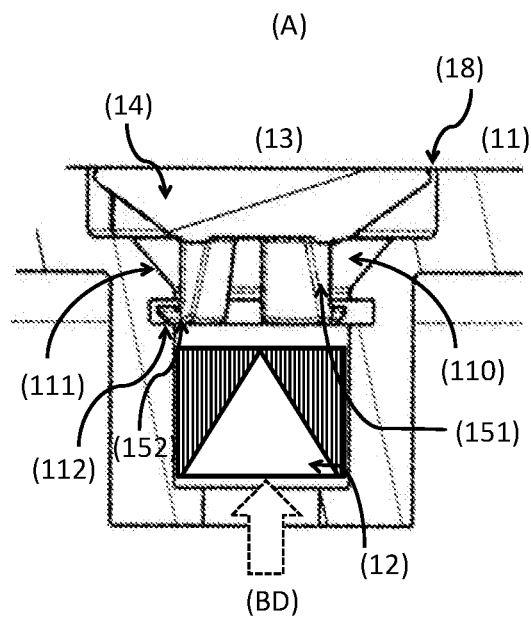
FIG. 7: detail view of a preferred embodiment of flux constrain disposition (13) of a beverage recipient (1) in a beverage distribution system according to the present invention.
Figure 8:
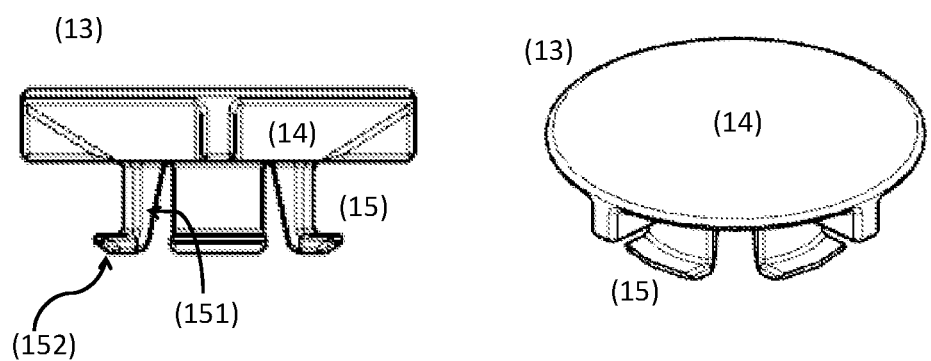
FIG. 8: side-cut view (on the left side) and in elevated perspective of the flux constrain disposition (13) of a beverage recipient (1) in a beverage distribution system according to the present invention.

FIGS. 7 and 8 represent detail views of a first embodiment of said flux constrain disposition (13).

It is preferred when said flux constrain disposition (13) is provided so that said flow impact wall develops in the downwards-oriented face of said flow deflecting element (14), and is configured so that extends transversally with relation to the prevailing flow direction upstream in a central region of said flow deflecting element (14), an extends along an oblique direction relative to the prevailing flow direction upstream in a periphery region of said flow deflecting element (14).

Moreover, it is preferred when said flux constrain disposition (13) is configured so that the flow prevailing direction is deflected twice downstream of said flow regulation disposition (12), so that the discharge flow (BD) enters in said collection space (A) along a direction similar to the prevailing flow direction upstream.

According to another embodiment, said flux constrain disposition (13) is provided so that said flux deflecting element (14) confines a perimeter flow passageway section with relation to the wall of said flow passageway opening (110), whereby it is preferred when at least one of area and configuration of said flow passageway section varies along said flux constrain disposition (13).

It is further preferred when said flux constrain disposition (13) is provided so that results a free space of gap type, preferentially with less than 3 mm, particularly preferred with less than 2 mm, between the exterior edge of flow deflecting element (14) and the edge of said flow passageway opening (110), so that the discharge flow (BD) flows to the interior of the collection space (A) though a reduction of area of the flow passage section.

It is preferred when said flux constrain disposition (13) is adapted so that can be retained in fixed manner in the interior of said flow passageway opening in the base zone of the beverage recipient.

It is preferred when said flux constrain disposition (13) presents a total extension, along a prevailing flow direction, smaller than 30 mm, preferentially smaller than 10 mm.

It is preferred when said flow deflecting element (14) presents a shape of disk type, or similar, and said retention element upstream presents a shape of feet developing from the upstream-oriented face of said flow deflecting element (14).

It is preferred when said flow deflecting element (14) presents a characteristic dimension, along a direction transversal to the prevailing flow direction, for example a diameter, comprised between 6 and 20 mm, preferentially between 8 and 14 mm.

As can be observed in FIG. 5, according to a preferred embodiment, said flux constrain disposition (13) is provided so that the surface of said flow deflecting element (14) oriented to the interior of said collection space (A), results substantially aligned with the interior surface of said base region (11), and preferentially presents a similar appearance as the remaining interior surface of beverage recipient (1, 1').

According to another preferred embodiment, said flux constrain disposition (13) provides a plurality of flow passageways that develop in the downwards-oriented face of said flow deflecting element (14), so that said beverage discharge (BD) flows to the interior of said collection space (A) along at least two, or three, or four, flow passageways that extend along at least 50%, particularly preferred along at least 70%, of the perimeter of said flow deflecting element (14).

According to another preferred embodiment, said flux constrain disposition (13) presents a retention element (15) provided with elastic behaviour, so that provides retention by means of elastic pressure in the radially outwards direction, against the wall of said flow passageway opening (12).

It is preferred when said retention element (15) comprises a plurality of elastic retention elements (15) that develop in manner of legs, or similar, from the upstream oriented surface of said flow deflecting element (14), and that prolong along a generally vertical direction, preferentially oblique, whereby said elastic retention elements (15) are provided so that exert elastic pressure sideways, upon the sidewalls of said collection opening (111), thereby retaining said flow constrain disposition (13) in a stationary position.

It is preferred when said elastic retention elements (15) present a first retention part (151) that develops at least approximately along the prevailing flow direction, and a second retention part (152) that extends transversally relative to said first retention part (151), in form of foot or similar, whereby said second retention part (152) is adapted so as to engage in a retention cavity (112) provided in the wall of the flow passageway opening (111).

It is preferred when said first retention parts (151) develop in the upstream-oriented surface of the flow deflecting element (14) along an alignment of circumferential type with a diameter comprised between 5 and 10 mm.

It is preferred when said first retention part (151) presents a dimension comprised between 1 and 3 mm.

It is preferred when said second retention part (152) presents a dimension comprised between 1 and 3 mm.

It has been demonstrated as particularly advantageous when said flux constrain disposition (13) present a flow deflecting element (14) that presents elastic behaviour in an exterior perimeter region thereof, so that can be elastically deflected under the action of the flow pressure of the discharge beverage flow (BD).

Figure 9:
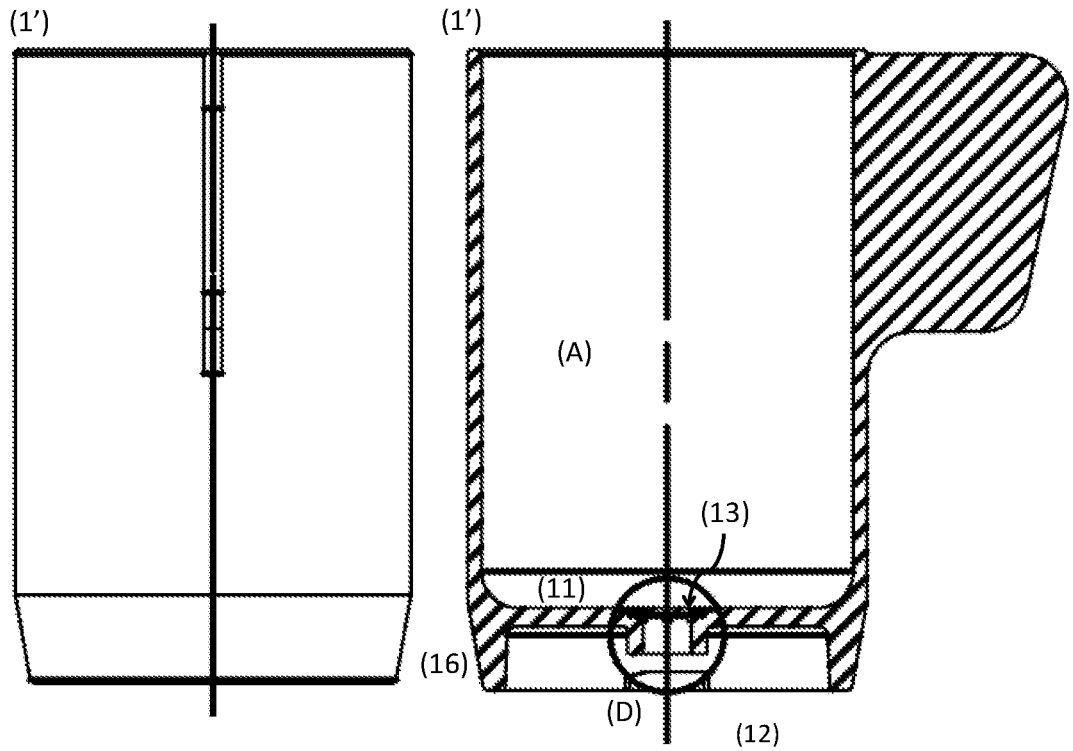
FIG. 9: Side view and respective cut—on the right side—, including detail (D), of a second type of beverage recipient (1') in a beverage distribution system according to the present invention.
Figure 10:
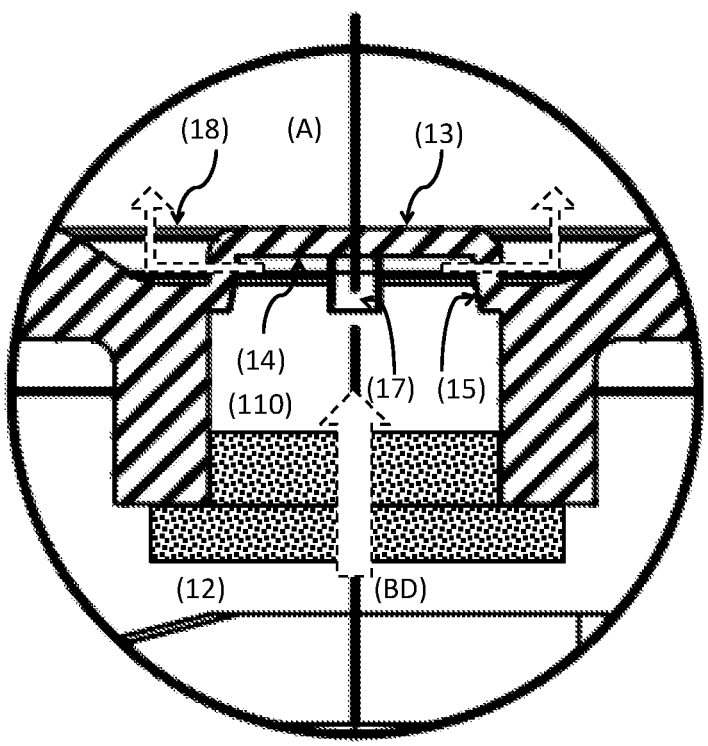
FIG. 10: detail view (D) according to FIG. 9.

FIGS. 9 and 10 represent a second type of beverage recipient (1') according to the present invention.

Said flux constrain disposition (13) is in this case provided integrally, in a single piece with said base region (11) of beverage recipient (1'). In particular, the flux constrain disposition (13) is provided with a general shape of disk type, or similar, corresponding to the flow deflecting element (14), arranged downstream of the flow passageway opening (110), in a region at the entry of the beverage discharge (BD) into the collection space (A) of beverage recipient (1'), and united in integral manner by means of at least one, preferentially a plurality of connection arms to a surrounding perimeter extension so that result flow passageways between said connection arms. It is in this case preferred when at least part of said flux constrain disposition (13) is provided in a substantially rigid material, or with reduced elastic deflection.

The flux constrain disposition (13) can present an interior passageway in a base portion thereof that communicates with a plurality of flow passageways provided along a perimeter region, so that the beverage flow enters in the collection space (A) along a direction non parallel to the gravity force direction.

Moreover, it is advantageous when said flux constrain disposition (13) confines jointly with the base wall (11), an entry passageway space (18), preferentially extending along a closed alignment and presenting a width of up to 10 mm, that mouths in the interior surface of base wall (11).

Figure 11:
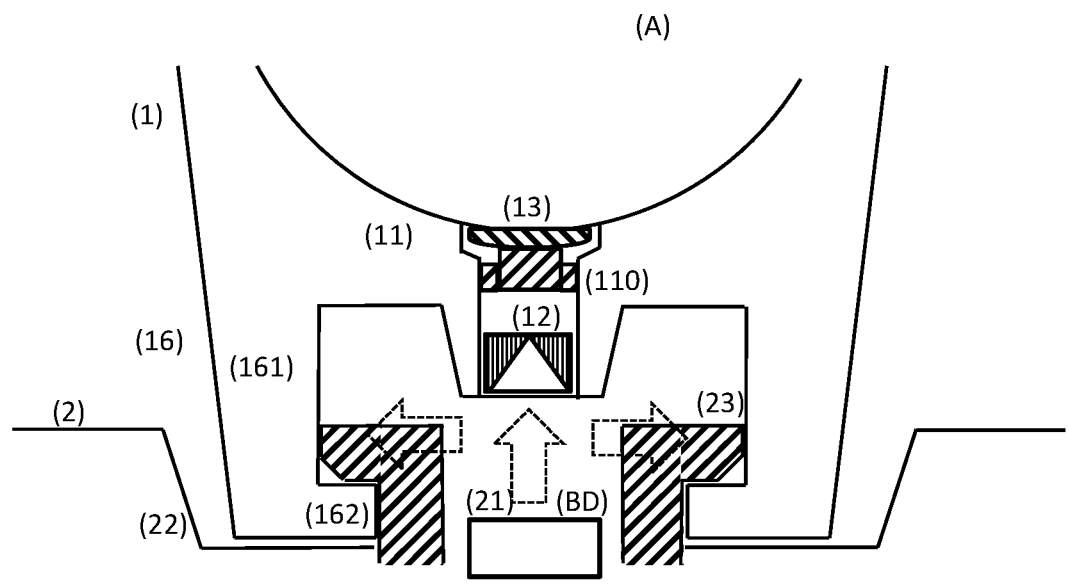
FIG. 11: side-cut view of detail of the base region (11) of beverage recipient (1) placed in a beverage discharge disposition (2) in a beverage distribution system according to the present invention.
Figure 12:
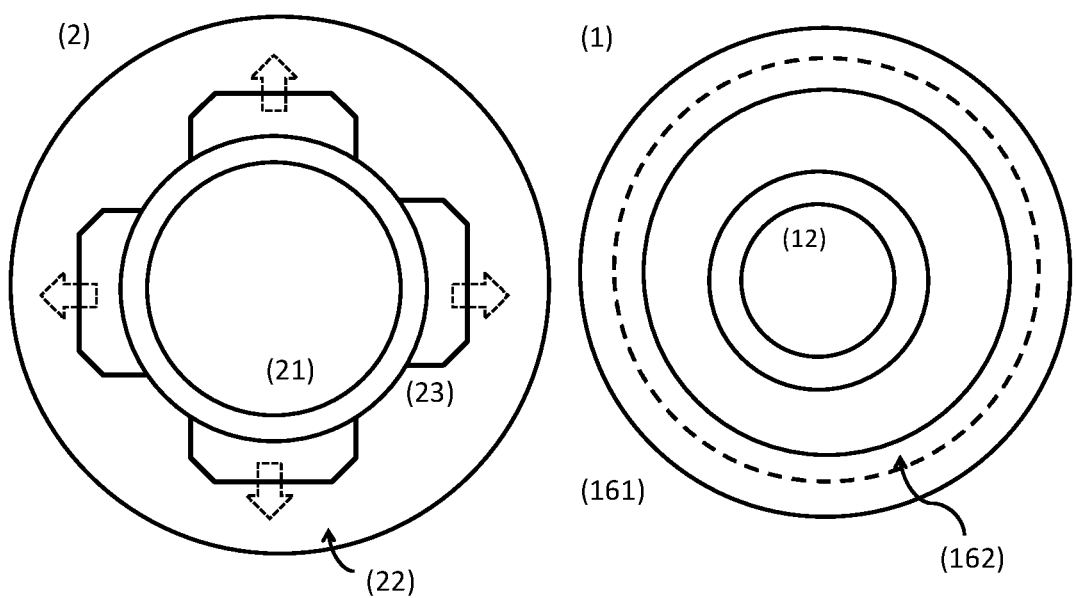
FIG. 12: superior top view of a beverage discharge disposition (2) and inferior view of the base region (11) of a beverage recipient (1) in a beverage distribution system according to the present invention.

FIGS. 11 and 12 represent details of the base region (11) of a beverage recipient (1) and type of engagement in a beverage discharge disposition (2) in a system according to the present invention.

It is preferred when said beverage recipients (1, 1') presents an engagement portion (16) that projects from said base part (11) and is adapted so that said beverage recipient (1, 1') can be placed in the recipient placement surface (22) of beverage discharge disposition (2), and that can be mechanically retained in said recipient placement surface (22) by mechanical engagement with engagement elements (23) adapted so as to engage with said engagement portion (16) and retain the beverage recipient (1, 1') in a position where said flow regulation disposition (12) is vertically aligned above of said discharge means (21).

In the case of the embodiment represented in FIG. 11, the beverage discharge disposition (2) is provided so that said engagement elements (23) can be actuated between an open position (A) and a closed position (B), preferentially at least partially simultaneous with the upwards movement of said discharge means (21), and vice-versa, and by a similar actuation device (not represented).

It is preferred when said beverage discharge means (21) includes at least one flow exit generally oriented upwards, and sealing element of o-ring type, or similar, whereby said beverage discharge means (21) is united with said brewing device (4) by means of a tube, preferentially of flexible type (not represented in FIG. 12).

As one can better observe in FIG. 12, said beverage discharge disposition (2) presents a plurality of engagement element (23) provided oriented radially outwards, with relation to the beverage discharge means (21), configured so that can engage by means of a pressured fitting type of connection in corresponding fitting elements (162) provided in a cavity part of said base region (11), thereby retaining the beverage recipient (1) in removable manner in the beverage discharge disposition (2).

As indicated by the arrows (drawing on the left side), it is preferred when said engagement elements (23) are adapted so that can be actuated by at least one of mechanic and elastic means, between an open position where they enable the placement of a beverage recipient (1, 1') upon said beverage discharge means (21), and a closed position where they are driven in a translation movement radially outwards, for retention of the engagement portion (16), thereby retaining the beverage recipient (1, 1') during the beverage discharge.

The invention claimed is:

1. A system for distribution of beverages that comprises:
at least one type of beverage recipient (1, 1') with a collection space (A) developing upwards from a base wall (11) that presents a flow passageway opening (110), a flow regulation disposition (12) comprising a valve that provides flow passage if impinged with at least a given flow passage pressure upstream; and
at least one type of beverage apparatus (3) operatively associated with a beverage discharge disposition (2) that comprise a beverage discharge element (21) oriented to discharge the beverage along a beverage discharge flow (BD) upwards with said flow passage pressure, and a recipient placement surface (22) surrounding said beverage discharge element (21),
wherein said beverage recipient (1, 1') further comprises a flux constrain disposition (13) that is disposed within said flow passageway opening (110) downstream of said flow regulation disposition (12), and is statically operational to change at least one of prevailing flow direction and flow passage section along said flux constrain disposition (13), so that a flow pattern at an entry in a base region of the collection space (A) is different from a flow pattern directly downstream of said flow regulation disposition (12),
wherein said flux constrain disposition (13) is provided in a stationary position in proximity downstream of said flow regulation disposition (12) and developing in at least one of: at least partially inside of said flow passageway opening (110), at least in the proximity and at least in its most part not above of the interior surface of the base wall (11) in the base region of collection space (A), and
wherein said flux constrain disposition (13) comprises a non-moving flow deflecting element (14) that provides at least one of: a flow impact wall and a reduction of flow passage section, whereby said flow impact wall develops in the downwards-oriented wall of said flow deflecting element (14), and extends along a direction transversal in relation to the prevailing flow direction upstream in a central region of said flow deflecting element (14), and along an oblique direction relative to the prevailing flow direction, upstream in a peripheral region of said flow deflecting element (14).

2. The system according to claim 1, wherein said flux constrain disposition (13) is configured so that the prevailing flow direction is deflected twice, downstream of said flow regulation disposition (12), so that the discharge flow (BD) enters in said collection space (A) along a direction similar to the prevailing flow direction upstream thereof.

3. The system according to claim 1, wherein said flux constrain disposition (13) is provided so that said flow deflecting element (14) confines a flow passage section along a respective perimeter, with relation to a wall of said flow passageway opening (110), and
wherein said flux constrain disposition (13) is provided so that at least one of area and configuration of said flow passage section, varies along said flux constrain disposition (13) along the flow direction.

4. The system according to claim 1, wherein said flux constrain disposition (13) provides a free space of gap type between an exterior edge of flow deflecting element (14) and an edge of said flow passageway opening (110), so that the discharge flow (BD) flows to the collection space (A) though a reduction of area of the flow passage section.

5. The system according to claim 1, wherein said flux constrain disposition (13) is provided so that a surface of said flow deflecting element (14) oriented to an interior of said collection space (A), results substantially aligned with an interior surface of said base region (11), and preferentially presents a similar appearance as a remaining interior surface of the beverage recipient (1, 1').

6. The system according to claim 1, wherein said flux constrain disposition (13) comprises a plurality of flow passageways (17), so that said beverage discharge flow (BD) flows downstream of said flux constrain disposition (13) through at least two flow passageways (17), and wherein said flow passageways (17) develop along a perimeter extension of said flux constrain disposition (13) and present flow passage sections that are different from the flow passage section upstream thereof.

7. The system according to claim 1,
wherein said flux constrain disposition (13) is associated with said flow passageway opening (110) of the base region (10) of beverage recipient (1, 1') by means of at least one of:
retained inside of said flow passageway opening (110), preferentially by means of pressured fitting so that resists to a flow pressure of at least 15 bar, and
provided integral in a single piece with the base region (11) of said beverage recipient (1, 1'), preferentially in the proximity downstream of said flow passageway opening (110).

8. The system according to claim 1,
wherein said flux constrain disposition (13) is associated with said flow passageway opening (110) by means of a plurality of retention elements (15) that confine between themselves said plurality of flow passageways (17).

9. The system according to claim 1,
wherein said flux constrain disposition (13) confines, jointly with a portion of said base wall (11), a flow entry (18) that develops along at least part of the perimeter extension of said flux constrain disposition (13) whereby said flow entry (18) preferentially presents a flow section smaller than the flow section of said flow passageway opening (110) upstream thereof.

10. The system according to claim 1,
wherein said flux constrain disposition (13) is provided so that the respective downstream-oriented surface does not project upstream of the surface of the base wall (11), and
wherein the respective downstream-oriented surface develops along at least approximately in at least one of: a common plane, and a continuous alignment, relative to at least part of said base wall (11).

11. The system according to claim 1,
wherein said flux constrain disposition (13) presents a retention element (15) provided as at least one of:
as part of a flux constrain disposition (13) provided as integral piece, and adapted to connect the flow deflecting element (14) to the base wall (11);
as part of a flux constrain disposition (13) provided as individual piece, and adapted to provide retention by means of elastic pressure in the radially outwards direction, against the wall of said flow passageway opening.

12. The system according to claim 1,
wherein said flux constrain disposition (13) presents a plurality of retention elements (15) that develop in a manner of legs from the upstream oriented surface of said flow deflecting element (14), and extend along a generally vertical direction, preferentially along an oblique direction,
whereby said retention elements (15) present elastic behaviour and are provided to exert elastic pressure sideways, upon the passageway sidewalls (111) of said flow passageway opening (110), thereby retaining said flux constrain disposition (13) on a stationary position.

13. The system according to claim 1,
wherein said beverage apparatus (3) is adapted for preparing aromatic beverages from an edible substance, and comprises, from upstream to downstream along the flow direction:
a flow pressurization device (7), adapted to supply a fluid flow (FS) at a flow pressure comprised between 1 and 20 bar, preferentially at least 10 bar,
a brewing device (4) adapted to collect a portion (5) of edible substance, optionally provided inside of a capsule, and to supply a beverage discharge flow (BD) of resulting beverage,
a beverage discharge disposition (2) adapted to provide support for placement of at least one, preferentially a plurality of types of beverage recipient (1, 1'), and discharge of said beverage discharge flow (BD) to the interior of said collection space (A),
whereby said beverage preparation apparatus (3) presents an opening (8) that provides an introduction of a portion (5) of edible substance, and can be closed and supply connects to said brewing device (4), and is adapted for supplying said portion (5) of edible substance,
whereby said opening (8) is provided next to said beverage discharge disposition (2), preferentially in the same exterior surface of said beverage preparation apparatus (3).

14. The system according to claim 1, wherein the system includes a plurality of types of beverage recipients (1, 1') presenting different dimensions, in particular at least one of different dimensions of collection space (A), different dimensions of the base walls (11) and different characteristic dimensions of the flux constrain disposition (13), such as for example number of flow passageways, respective flow section, elastic coefficient of at least part of respective flow deflecting element (14), but adapted so that can be retained by mechanical engagement in a same type of beverage discharge disposition (2), in particular presenting an engagement portion (16) with similar engagement height (h), whereby at least one of said types of beverage recipients (1, 1') preferentially is not a disposable recipient.

* * * * *